Aug. 18, 1925.

M. D. GOODWIN 1,549,866

SPEED CONTROL

Filed March 18, 1924

Inventor
M. D. Goodwin
By C. A. Snow & Co.
Attorneys

Patented Aug. 18, 1925.

1,549,866

UNITED STATES PATENT OFFICE.

MALCOLM DILLON GOODWIN, OF ROANOKE, VIRGINIA.

SPEED CONTROL.

Application filed March 18, 1924. Serial No. 700,089.

*To all whom it may concern:*

Be it known that I, MALCOLM DILLON GOODWIN, a citizen of the United States, residing at Roanoke, in the county of Roanoke and State of Virginia, have invented a new and useful Speed Control, of which the following is a specification.

This invention relates to a speed control designed primarily for use upon motor driven vehicles, one of the objects of the invention being to provide a speed controlled switch connected to and operated by one of the rotating parts of a vehicle and so arranged that, when the speed of the vehicle passes a predetermined rate, the current through the ignition system will be cut off automatically.

A further object is to provide mechanism of this character which is simple and compact in construction and can, if desired, be connected to the hub portion of a wheel so as to be actuated by the rotation of the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1:
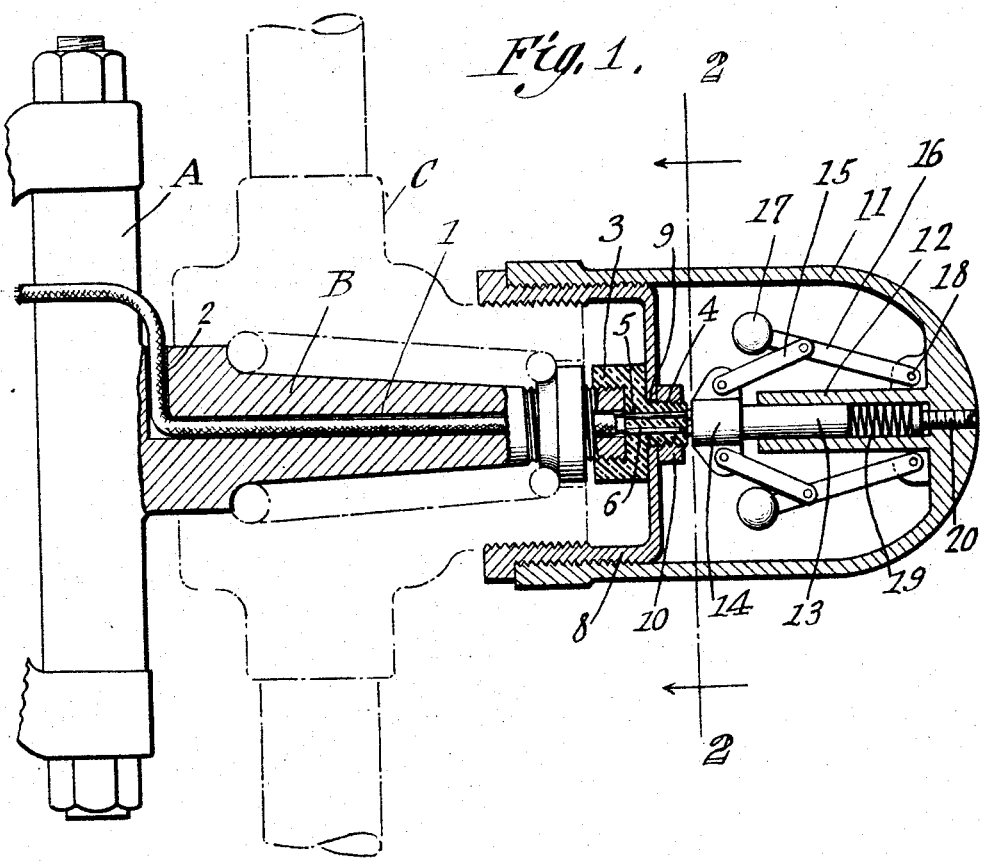
Figure 1 is a section through the device constituting the present invention, a portion of the wheel being indicated by broken lines.
Figure 2:
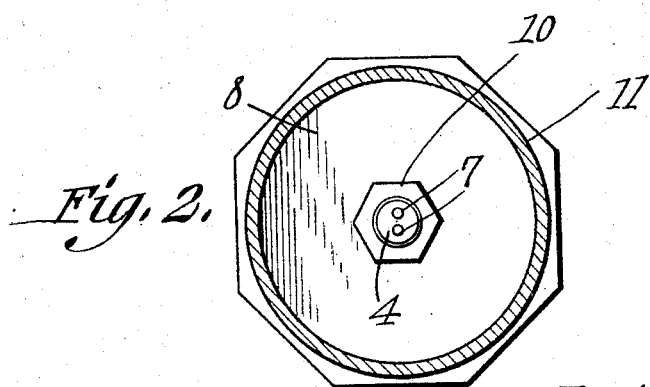
Fig. 2 is a section on line 2—2, Fig. 1.

Referring to the figures by characters of reference A designates a steering knuckle having a spindle B on which the hub C of a wheel is mounted to rotate in the usual manner. In the present instance the spindle B has a bore 1 extending longitudinally therein and provided with a radial outlet 2 at one end. A nut 3 engages the outer end of the spindle and has a threaded extension 4. This nut is provided with separate openings 5 in which are mounted the insulated terminals of wires 6, the said wires being provided with contacts 7 at their outer ends exposed beyond the end of the extension 4. The wires 6 are extended through the bore 1 and radial opening 2 and form a part of the ignition circuit of the vehicle.

The hub C is provided with a cap 8 the central portion of which has an opening 9 through which projects the extension 4, there being a nut 10 upon the extension for clamping against the cap 8 as shown.

A housing 11 is adapted to be screwed onto the cap 8, this housing being closed at its outer end. Extending inwardly from the outer end of the housing is a guide sleeve 12 in which is mounted a plunger 13. This plunger is slidable and has a collar 14 at its inner end to which are pivotally connected links 15. These links are also pivotally connected to levers 16 carrying weights 17. Levers 16 are pivotally attached to the housing 11 as shown at 18. A spring 19 is mounted in the guide sleeve 12 and bears against plunger 13 so as to hold the ends of the plunger normally pressed against the ends of the contacts 7, thereby to maintain an electrical connection between the contacts so that the circuit of the ignition is normally closed. A screw 20 is adjustably mounted in the outer end of the housnig 11 and bears at its inner end against spring 19. Thus by the use of a screw driver or the like the screw can be rotated to vary the compression of spring 19 and increase or reduce the resistance offered by the spring to the movement of the weight 17 under the action of centrifugal force.

Under ordinary conditions, where the wheel of the vehicle is rotating at less than a predetermined speed, the spring 19 will support the weight 17 and hold the ends of plunger 13 against contact 7. However, should the rotation of the wheel become excessive the weight 17 would be thrown outwardly by centrifugal force, thereby drawing plunger 13 against spring 19 and away from the contact 7. Thus the circuit through the ignition system will be broken and the operation of the engine will be stopped until the speed of the vehicle has been reduced sufficiently to allow the spring 19 to again thrust plunger 13 against the contact 7.

Obviously the housing 7 can be sealed so that access cannot be had to the interior thereof by unauthorized persons.

The speed controlling device can be applied to any of the wheels of a vehicle by making necessary modifications in the arrangement of the parts or, if desired, it can be mounted at any suitable point on the vehicle where it can be driven by some part operated by the forward movement of the vehicle.

What is claimed is:—

1. The combination with a bearing element of a vehicle, and a wheel mounted for rotation thereon, of separate insulated contacts carried by the bearing element, a housing rotatable with the wheel, a circuit closing element rotatable with the housing, adjustable yieldable means for holding said element normally in engagement with the contacts, and a centrifugal governor within the housing and connected to said element for shifting it away from the contacts when the rotation of the wheel housing reaches a predetermined speed.

2. The combination with a bearing element, a wheel mounted for rotation thereon, and spaced contacts carried by the bearing element, of a housing rotatable with the wheel, a guide in the housing, a slidable member carried by the guide and normally engaging the contacts to close the circuit therebetween, and a centrifugal governor within the housing for shifting the circuit closer out of normal position when the rotation of the wheel and housing reaches a predetermined speed.

3. The combination with a bearing element, a wheel mounted for rotation thereon, and spaced contacts carried by the bearing element, of a housing rotatable with the wheel, a guide in the housing, a slidable member carried by the guide and normally engaging the contacts to close the circuit therebetween, and a centrifugal governor within the housing for shifting the circuit closer out of normal position when the rotation of the wheel and housing reaches a predetermined speed, and adjustable yieldable means for holding the circuit closer normally against the contacts.

In testimony that I claim the foregoing as my own, I have hereto affixed my signature.

MALCOLM DILLON GOODWIN.